UNITED STATES PATENT OFFICE.

LEO H. BAEKELAND, OF YONKERS, AND NATHANIEL THURLOW, OF NEW YORK, N. Y., ASSIGNORS TO GENERAL BAKELITE COMPANY, OF NEW YORK, N. Y., A CORPORATION OF NEW YORK.

PHENOLIC CONDENSATION PRODUCT AND METHOD OF MAKING THE SAME.

1,187,231.      Specification of Letters Patent.     Patented June 13, 1916.

No Drawing.     Application filed December 11, 1912. Serial No. 736,214.

*To all whom it may concern:*

Be it known that we, (1) LEO H. BAEKELAND and (2) NATHANIEL THURLOW, citizens of the United States, residing at (1) Yonkers and (2) New York, in the counties of (1) Westchester and (2) New York, State of New York, have invented certain new and useful Improvements in Phenolic Condensation Products and Methods of Making the Same, of which the following is a specification.

For the preparation of insoluble, infusible phenolic condensation products, several methods are known, involving the reaction of hexamethylenetetramin, or of mixtures of formaldehyde and ammonia which are equivalent to hexamethylenetetramin, upon phenols, or upon oxybenzyl-alcohols, such as saligenin, or upon dehydration products thereof, as for instance the so-called fusible, resinous phenol-formaldehyde condensation products variously known as saliretins, phenol resins, shellac substitutes, novolak, etc.

In all such methods, considerable amounts of ammonia are set free. This abundant evolution of ammonia exaggerates the tendency of the mass to foam when subjected to the hardening process under the influence of heat, and may give rise to porous final products, which are defective for most purposes. Such foaming or porosity may be avoided by applying a suitable counter-pressure during the act of heating, in which case considerable free ammonia remains in the mass.

The present invention relates to methods of preparing phenolic condensation products in such manner as to avoid or diminish the objection above mentioned, and also to the products formed in the practice of such methods.

According to the present invention, we substitute for a part or all of the hexamethylenetetramin which as is well known is an organic base, a suitable salt of this base, for instance hexamethylenetetraminhydrochlorid, sulfate, tartrate, oxalate, etc. By proceeding in this manner a considerable portion of the ammonia, which would otherwise be set free, combines with the hydrochloric acid or with other acid entering into the constitution of the salt, forming a corresponding ammonium salt, which, in the case of hexamethylenetetraminhydrochlorid, is chlorid of ammonium. The new method presents also the additional advantage that the hardening by application of heat is decidedly quickened, as compared with the use of hexamethylenetetramin.

The invention will be explained by reference to certain illustrative embodiments thereof, it being understood that the invention is not restricted to these examples, or to the specific proportions and conditions therein disclosed as preferable.

Example I: 140 grams of phenol, or the chemically equivalent proportion of the homologues of phenol, is mixed with 47 grams of hexamethylenetetraminhydrochlorid, and the mixture heated to approximately 110° C. A reaction sets in, accompanied by foaming and thickening of the mass and evolution of ammonia. At this stage the product may be dissolved in suitable solvents, as for instance acetone, alcohol, amylacetate, and the like, or preferably in mixtures of these solvents, yielding therewith varnishes or lacquers which may be applied and baked on in the manner now well understood in the art. Or the mass resulting from this first reaction, without addition of solvent liquids, may be subjected to further heating preferably in suitable molds and under pressure. Application of an increased temperature will soon harden the product to the infusible and insoluble state. A suitable temperature is, for instance, 160° C., although lower or higher temperatures may be used. The proportions of hexamethylenetetramin salt and phenol may be varied within the reasonable limits in which the same technical effects are obtainable, the use of unnecessarily large proportions of the hexamethylenetetramin salt being preferably avoided.

By means of the methods above described, it is possible to obtain substances similar to or identical with those infusible, insoluble condensation products already described in the patent and technical literature, which substances may be used for many purposes, as for instance varnishes, lacquers, artificial resins, plastics and the like.

The reactions above described may be carried out either in presence or absence of water.

Example II: We first prepare in any suitable manner a fusible, soluble, resinous phenolic condensation product of the type known to the art under the names of saliretin, phenol resin, shellac substitutes, novolak, etc. To 100 parts of this resinous condensation product, preferably in the form of a substantially dry powder, are added approximately 10 parts of dry hexamethylenetetraminhydrochlorid. The components are thoroughly mixed and then subjected to heat, suitable conditions being as described under Example I.

It is to be understood that suitable comminuted filling materials may be added as required, as well as other substances serving to improve the physical or chemical qualities of the final product or of the original reacting materials. For instance, we may add solid, semi-liquid or liquid materials of the character described in U. S. Patent No. 942,699, patented December 7, 1909, to L. H. Baekeland, such additions serving to reduce the brittleness of the final product, or to improve the plasticity thereof by acting as solid solvents therefor or otherwise. Instead of phenol, other suitable phenolic bodies, as for example the homologues of phenol, may be used. Similarly, instead of formaldehyde or hexamethylenetetraminhydrochlorid, we may use the equivalents of these substances.

Instead of carrying out the reaction in a continuous operation, the reaction may be interrupted at suitable times in order to obtain products which are still fusible and soluble, and can be kept in stock or sold in the trade, such products being employed at a later period for the purposes of this invention. For example, such soluble condensation products may be dissolved in suitable solvents for the preparation of varnishes or lacquers, or used for molding purposes, as plastics, either alone or in conjunction with such suitable filling materials as wood fiber, asbestos and the like. The transformation into the final product can be brought about when and under the conditions desired by the application of heat, or better by the joint application of heat and pressure. Inasmuch as the use of the salt of hexamethylenetetramin has for its object the limitation of the production of free ammonia, it will be understood that this favorable action may be supplemented as desired by the use of other substances having a tendency to fix the free ammonia, as for example solid organic anhydrids.

In the claims, the term "phenolic body" is used to designate not only phenol and its homologues, but also such soluble, fusible phenolic condensation products as are referred to under Example II. The term "phenolic condensation products" is intended to include both the infusible and insoluble, and also the fusible and soluble condensation products. The expression "a phenol" is used to include the homologues of phenol, and mixtures containing the same.

We claim:

1. The method of making phenolic condensation products, which consists in reacting upon a phenolic body with a salt of hexamethylenetetramin.

2. The method of making phenolic condensation products, which consists in reacting upon a phenolic body with hexamethylenetetraminhydrochlorid.

3. The method of making phenolic condensation products, which consists in reacting upon a phenol with a salt of hexamethylenetetramin.

4. The method of making phenolic condensation products, which consists in reacting upon a phenol with hexamethylenetetraminhydrochlorid.

5. As a new composition of matter, a mixture containing a phenolic body and a salt of hexamethylenetetramin, said mixture transformable by heat into an infusible, insoluble body.

6. As a new composition of matter, a mixture containing a phenolic body and hexamethylenetetraminhydrochlorid, said mixture transformable by heat into an infusible, insoluble body.

7. The herein-described composition of matter, containing a fusible phenolic condensation product and a salt of hexamethylenetetramin, said composition transformable by heat into an infusible and insoluble body.

8. The herein-described composition of matter, containing a fusible phenolic condensation product and hexamethylenetetraminhydrochlorid, said composition transformable by heat into an infusible and insoluble body.

9. The herein-described amorphous phenolic condensation product resuulting from the reaction between a phenolic body and a salt of hexamethylenetetramin, said product characterized by the presence therein of an ammonium salt corresponding to the said salt of hexamethylenetetramin.

10. The herein-described amorphous phenolic condensation product resulting from the reaction between a phenolic body and hexamethylenetetraminhydrochlorid, said product characterized by the presence therein of ammonium chlorid.

In testimony whereof, we affix our signatures in presence of two witnesses.

LEO H. BAEKELAND.
NATHANIEL THURLOW.

Witnesses:
HERBERT S. MAY,
CHARLES B. MORTON.